United States Patent [19]
Ribbens et al.

[11] Patent Number: 5,487,008
[45] Date of Patent: Jan. 23, 1996

[54] METHOD AND SYSTEM FOR DETECTING THE MISFIRE OF A RECIPROCATING INTERNAL COMBUSTION ENGINE IN FREQUENCY DOMAIN

[75] Inventors: William B. Ribbens, Ann Arbor; Jaehong Park, Ann Arbor, both of Mich.

[73] Assignee: The Regents of the University of Michigan, Ann Arbor, Mich.

[21] Appl. No.: 23,342

[22] Filed: Feb. 26, 1993

Related U.S. Application Data

[63] Continuation-in-part of Ser. No. 512,779, Apr. 20, 1990, Pat. No. 5,200,899, and a continuation-in-part of Ser. No. 741,338, Aug. 21, 1991, Pat. No. 5,239,473, and a continuation-in-part of Ser. No. 759,397, Sep. 13, 1991, Pat. No. 5,278,760.

[51] Int. Cl.⁶ .............................. G06F 19/00; F02P 5/00; G01L 3/26
[52] U.S. Cl. .............................. 364/431.04; 364/431.07; 364/431.05; 364/431.08; 73/116; 73/117.3; 73/660; 123/414; 123/425
[58] Field of Search .......................... 364/431.01–431.12, 364/424.1; 123/414, 416, 419, 425, 436, 478, 90.12, 479; 73/116, 660, 117.2, 117.3, 859; 324/384, 385, 399, 379

[56] References Cited

U.S. PATENT DOCUMENTS

| | | | |
|---|---|---|---|
| 4,083,234 | 3/1978 | Aono et al. | 73/116 |
| 4,424,709 | 1/1984 | Meier, Jr. et al. | 73/117.3 |
| 4,468,956 | 5/1984 | Merlo | 73/117.3 |
| 4,783,998 | 11/1988 | Sander | 73/660 |
| 5,041,580 | 8/1991 | Maddock et al. | 364/431.07 |
| 5,058,551 | 10/1991 | Nakaniwa | 123/425 |
| 5,095,742 | 3/1992 | James et al. | 73/116 |
| 5,116,259 | 5/1992 | Demizu et al. | 73/117.3 |
| 5,200,899 | 4/1993 | Ribbens et al. | 364/431.08 |
| 5,222,392 | 6/1993 | Baba et al. | 73/116 |
| 5,231,869 | 8/1993 | Klenk et al. | 73/116 |
| 5,237,504 | 8/1993 | Holmes et al. | 364/431.08 |
| 5,239,473 | 8/1993 | Ribbens et al. | 364/431.08 |
| 5,245,968 | 9/1993 | Kolias et al. | 123/414 |
| 5,263,365 | 11/1993 | Müller et al. | 73/117.3 |
| 5,269,178 | 12/1993 | Vigmostad et al. | 73/116 |
| 5,278,760 | 1/1994 | Ribbens et al. | 364/424.1 |
| 5,287,735 | 2/1994 | Klauber et al. | 73/116 |
| 5,287,736 | 2/1994 | Nakayama et al. | 73/116 |
| 5,331,848 | 7/1994 | Nakagawa et al. | 73/116 |
| 5,353,634 | 10/1994 | Baba et al. | 364/431.07 |

*Primary Examiner*—Kevin J. Teska
*Assistant Examiner*—Jacques H. Louis-Jacques
*Attorney, Agent, or Firm*—Brooks & Kushman

[57] ABSTRACT

Engine misfire is detected in a reciprocating internal combustion engine having an engine cycle frequency in the frequency domain from crankshaft angular velocity. Crankshaft angular position is sensed to develop an electrical signal which is a function of the crankshaft angular velocity. The electrical signal contains data which is sampled. The sampled data is transformed to an equivalent frequency domain spectrum including frequency components of the engine cycle frequency and harmonics thereof. A statistical decision algorithm is applied to the magnitudes of the frequency components to distinguish between a true misfire and normal cyclic variability which characterizes the combustion process. In one embodiment, the misfired cylinder is identified based on the phase of the frequency component at the engine cycle frequency. In another embodiment, the identity of the misfired cylinder is determined by shifting the sampled data prior to transforming the data.

10 Claims, 9 Drawing Sheets

METHOD AND SYSTEM FOR DETECTING THE MISFIRE OF A RECIPROCATING INTERNAL COMBUSTION ENGINE IN FREQUENCY DOMAIN

CROSS-REFERENCE TO RELATED APPLICATIONS

This application is a continuation-in-part application of the following co-owned patent applications: (1) "Method And System For Detecting The Misfire Of An Internal Combustion Engine Utilizing Angular Velocity Fluctuations", Ser. No. 512,779, filed Apr. 20, 1990 (now U.S. Pat. No. 5,200,899); and (2) "Method And System For Detecting The Misfire Of An Internal Combustion Engine Utilizing Angular Velocity Fluctuations" Ser. No 741,338, filed Aug. 21, 1991, (now U.S. Pat. No. 5,239,473), both of which are hereby expressly incorporated by reference in their entirety. This application is also a continuation-in-part application of a co-pending patent application entitled "Method And System For Detecting The Misfire Of An Internal Combustion Engine Utilizing Engine Torque Non-uniformity", Ser. No 759,397, filed Sep. 13, 1991 now U.S. Pat. No. 5,278,760.

TECHNICAL FIELD

This invention relates to methods and systems for misfire detection in a reciprocating internal combustion engine of an automobile and, in particular, to methods and systems for detecting such misfires utilizing nonuniformity of torque production in the frequency domain.

BACKGROUND ART

There are a number of requirements for on-board diagnostics II (OBDII) of the California Air Resources Board (CARB). Once such requirement is the ability to detect misfires in the engine in order to identify a malfunction.

One method for detecting such misfires is to produce a signal wave having a frequency variable with the frequency of exhaust noises of the engine. A signal is also produced which is variable with the output speed of the engine in order to analyze the frequency characteristics of the signal wave. This approach is illustrated in the Aono et al., U.S. Pat. No. 4,083,234.

The Meier, Jr. et al., U.S. Pat. No. 4,424,709 discloses a method for detecting engine defects in the frequency domain including cylinder misfires.

Whereas normal engine combustion involves a certain level of torque nonuniformity, misfire significantly increases the nonuniformity. This nonuniformity can be readily observed in the frequency domain. Furthermore, the torque nonuniformity results in a nonuniformity in crankshaft angular speed.

SUMMARY OF THE INVENTION

An object of the present invention is to provide a method and system for misfire detection from crankshaft angular velocity in the frequency domain wherein reciprocating forces of the engine can be ignored.

Another object of the present invention is to provide a method and system for misfire detection which complies with OBDII of the CARB.

In carrying out the above objects and other objects of the present invention, a method is provided for detecting the misfire of a reciprocating internal combustion engine including a plurality of reciprocating components having an engine cycle frequency, at least one cylinder and a crankshaft. The method includes the step of generating an electrical signal as a function of crankshaft angular velocity. The electrical signal contains data. The method also includes the steps of sampling the data synchronously with crankshaft angular position at a sampling rate to obtain sampled data and transforming the sampled data to an equivalent frequency domain spectrum, including frequency components leaving complex amplitudes at the engine cycle frequency and harmonics thereof. Finally, the method includes the steps of applying an algorithm to the magnitudes of the frequency components. The algorithm distinguishes between a true misfire and normal cyclic variability which characterizes the combustion process in each cylinder of the engine to thereby obtain a misfire signal.

Preferably, in one embodiment, the frequency components at the engine cycle frequency has a phase wherein the method further includes the step of identifying the cylinder in which the misfire occurred based on this phase.

Preferably, in another embodiment of the invention, the sampled data is shifted prior to the step of transforming in order to determine the misfiring cylinder.

Further in carrying out the above objects and other objects, a system is provided for carrying out the above method steps.

The above objects and other objects, features, and advantages of the present invention are readily apparent from the following detailed description of the best mode for carrying out the invention when taken in connection with the accompanying drawings.

BRIEF DESCRIPTION OF THE BEST MODE

Figure 1:
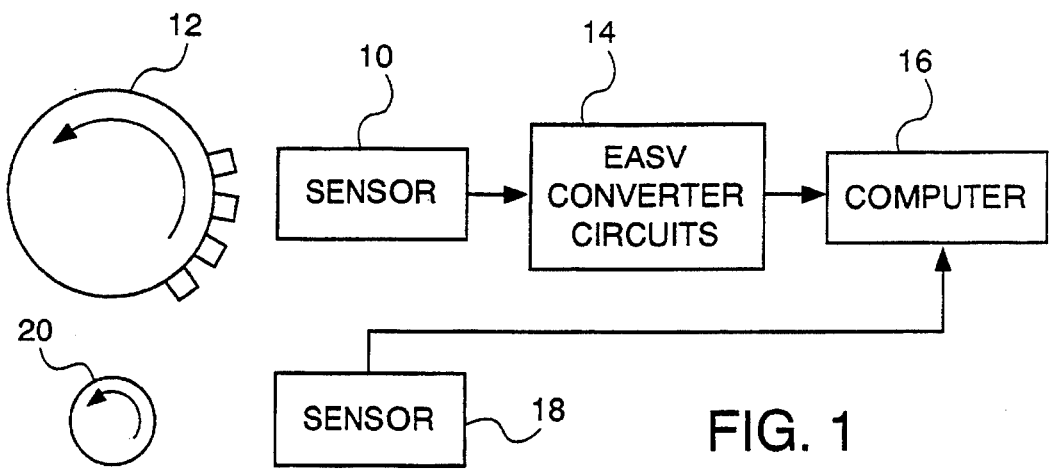
FIG. 1 is a schematic block diagram illustrating a system constructed in accordance with the present invention.

Referring now to the drawing figures, there is illustrated in FIG. 1 the components of a misfire detection system constructed in accordance with the present invention. In particular, a sensor 10 is positioned such that it responds to the angular position or angular speed of a crankshaft 12 of a reciprocating internal combustion engine. Electronic circuitry in the form of a EASV (engine angular speed-to-voltage) analog converter circuit 14 generates an electrical signal related to crankshaft angular speed. For example, a continuous time analog of angular speed in which:

$$v = k\omega_e$$

where $\omega_e$ is instantaneous crankshaft angular speed, v is the output voltage and k is a constant. A discrete time sampled version of this signal may alternatively be obtained.

A computer 16 makes computations necessary to detect misfire. These computations are explained below and include the capability of computing the spectrum of the crankshaft angular speed. The computer may employ, for example, a microprocessor configured to perform computations under program control. The program can, for example, conveniently be stored in a ROM memory chip.

The present method utilizes samples of crankshaft angular speed as will presently be shown. Estimates of crankshaft angular speed can be obtained without using the EASV analog computer circuit 14. These estimates are sufficiently accurate for the procedures explained below with a relatively low number of samples. Such sampled estimates ti (denoted $\hat{\omega}_k$) for the k estimate are obtained using a multi-toothed structure connected to the crankshaft 12 and a non-conducting sensor. Letting $M_T$ be the number of teeth, then:

$$\hat{\omega}_k = \frac{2\pi}{M_T(t_k - t_{k-1})}$$

where $t_k$ = time the kth tooth passes the sensor.

In the present method and system, misfire is detected by examining the spectrum of the crankshaft angular speed signal. This signal may be obtained by any of the instrumentation methods outlined in the above-noted applications or by any applicable discrete time estimation method.

The spectrum of the angular speed signal may be computed using any one of a variety of commonly known techniques (e.g., discrete Fourier transform DFT or fast Fourier transform (FFT)). In this procedure, a sample of the crankshaft angular speed signal is obtained. The duration of this sample can be chosen to be a multiple of crankshaft revolutions.

By way of illustration, it is convenient to consider the spectrum as obtained by the discrete Fourier transform (DFT). For this purpose, the crankshaft angular speed is sampled at discrete instants of time or at discrete crankshaft angles for any given engine cycle or integer multiple of an engine cycle:

$$\omega_n = \omega(t_k) \; k=0, 1, 2 \ldots K$$

or $$\omega_n = \omega(\theta_k) \; k=0, 1, 2, K.$$

where K is the number of samples in the observation period (e.g. one complete engine cycle). These samples are obtained for a time interval T or a crankshaft angle θ. The spectrum for this set of samples is represented by the complex number $A_p$:

$$A_p = \sum_{k=0}^{K} \omega_k (W_K)^{pk} \quad p = 0, 1, \ldots K.$$

where $$W_K = \exp\left[ j\left( \frac{2\pi}{K} \right) \right]$$

The complex values of $A_p$ represents the magnitude and phase of the Fourier component of frequency $f_p$:

$$f_p = P/T.$$

For example, p=1 corresponds to the fundamental frequency for the time interval [0,T] or the crankshaft angular interval [0,θ].

Obviously, this algorithm is only exemplary. Other candidates include FFT which is faster and is applicable if K is a power of 2 (for example, $K=2^6$).

For certain applications, a time interval (or crankshaft interval) of two complete crankshaft revolutions corresponding to the one complete engine cycle for a 4 stroke/cycle reciprocating internal combustion engine. Other choices for this sample will also suffice such as four complete revolutions corresponding to two engine cycles. Such choice is beneficial for detecting isolated single misfire events, for example.

In this method, the complete spectrum need not be computed. Rather, only a few Fourier components are needed. One convenient choice is to compute the fundamental Fourier component at frequency $f_1$ for a complete engine cycle, i.e., T is the period for two complete crankshaft revolutions. In this case, $f_1$ is the fundamental frequency of a Fourier analysis of angular speed for a duration of one complete engine cycle and can conveniently be called engine cycle frequency. Also of interest is the component at N times this frequency ($f_c$) where N=number of cylinders ($f_c=Nf_1$). The Fourier amplitude at engine cycle frequency $f_1$ is $M_1$ and at cylinder firing frequency (i.e., $f_n$) is $M_N$ for a N cylinder engine and for a period T corresponding to one engine cycle (two crankshaft revolutions).

In one embodiment, it is possible to identify individual misfiring cylinder(s) by means of an engine cycle signal generated by a sensor 18 which is activated by a specific point on the engine camshaft 20, as illustrated in FIG. 1. For example, a magnetic sensor can be positioned close to a lug on the camshaft 20. A voltage pulse is then generated each time this lug rotated past the sensor axis. This algorithm is discussed in greater detail hereinbelow.

Additionally, the spectrum can be computed for a sample of duration for two complete engine cycles. In this case, a convenient choice for misfire detection is the fundamental frequency $f_1$, the second harmonic $f_2=2f_1$ and the harmonic at cylinder firing frequency $f_c=2Nf$.

Figure 2:
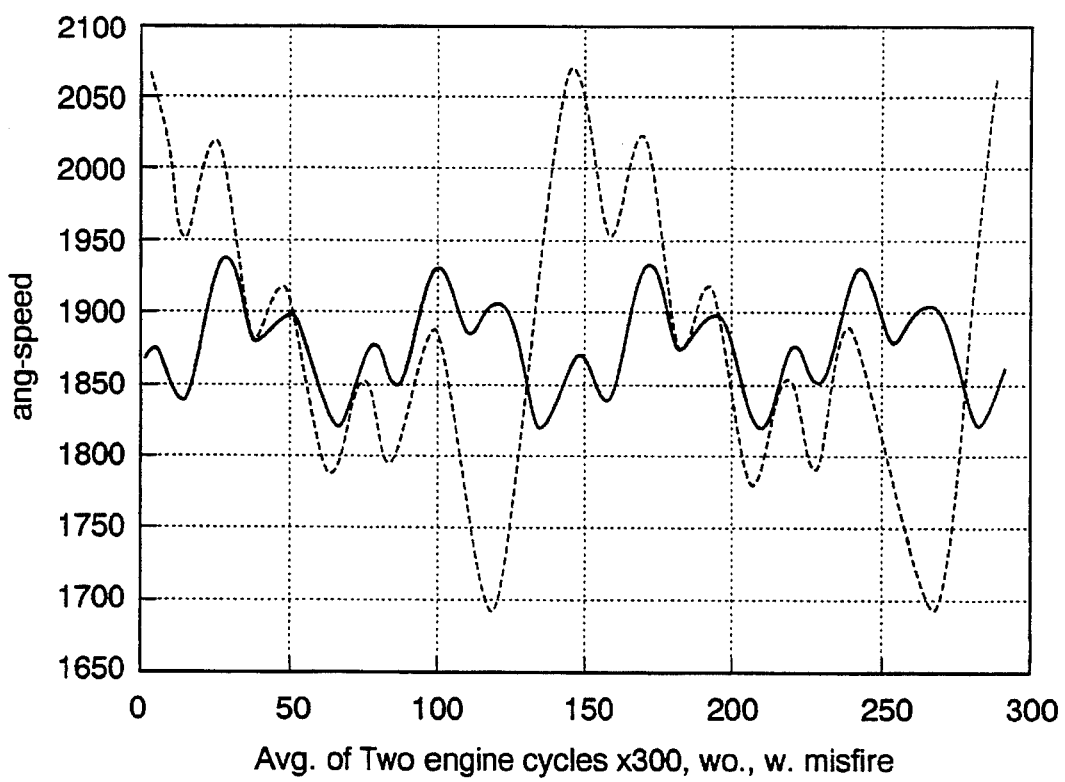
FIG. 2 is a graph illustrating a sample of crankshaft angular speed for two complete engine cycles of a six cylinder engine wherein the solid curve is for normal combustion and the dashed curve is for a misfire condition.

As an illustration of the concepts presents in this disclosure, it is convenient to refer to FIG. 2. This figure presents a sample of crankshaft angular speed for two complete engine cycles of a 6 cylinder engine. The solid curve is for normal combustion and the dashed curve is for a misfire condition.

Figure 3:
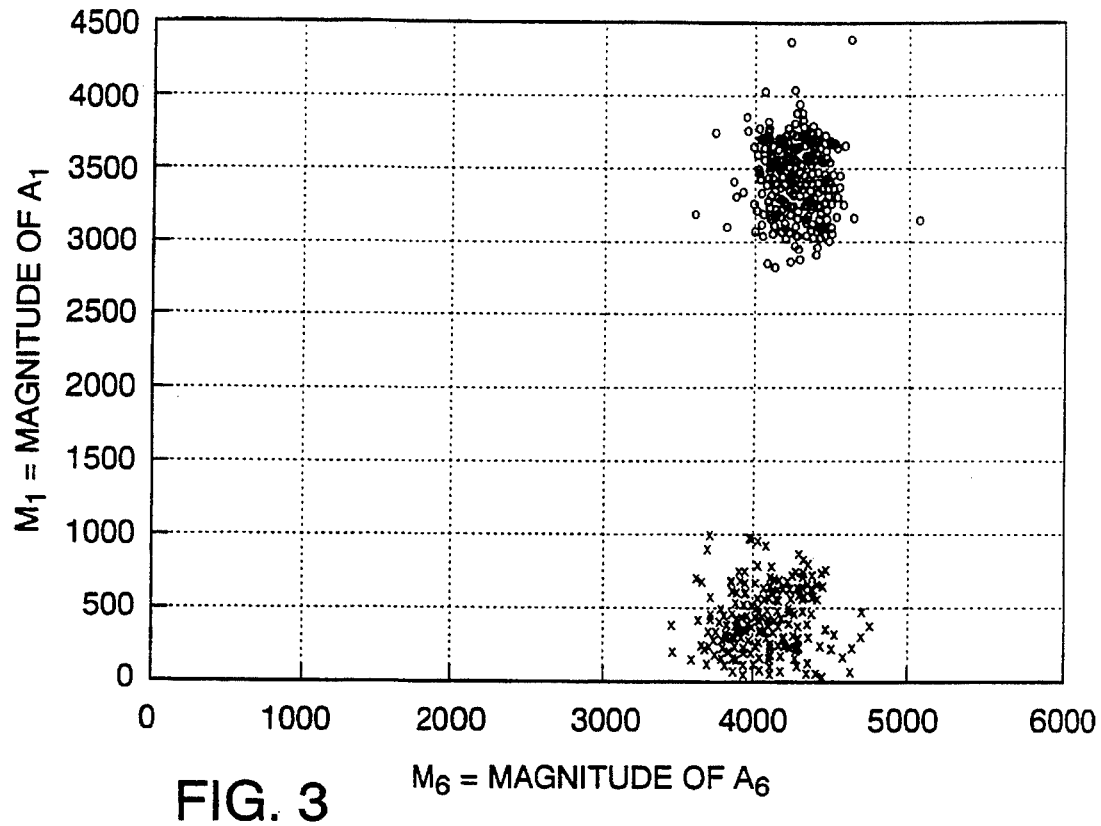
FIG. 3 is a graph plotting engine cycle frequency Fourier amplitude, $M_1$, at $f_1$ versus cylinder firing frequency amplitude, $M_N$, at $f_c$.

FIG. 3 shows a two-dimensional plot of engine cycle frequency Fourier amplitude $M_1$ (i.e., at $f_1$) versus the amplitude $M_N$ cylinder firing frequency (i.e., $f_c$) amplitude.

This data was obtained at no load 3250 RPM in second gear with the torque converter in lockup at 100 km/hr. The data points indicated by x are normal combustion and the data points indicated by 0 are misfire conditions. Clearly misfire can be readily detected from this figure.

Misfire can also be detected from the Fourier components via electronic circuitry. For example, one embodiment of the present invention incorporates a computer which performs calculations to obtain the Fourier components of crankshaft angular speed. This computer can detect misfire via one of many algorithms.

For example, the Fourier amplitudes of $f_1$ and $f_c$ (i.e., $M_1$ and $M_6$) can be mapped into a two-dimensional plane. Misfire detection can be accomplished as a decision function of these two variables. One such function is the ratio $M_1/M_6$. A simple comparison of this ratio to a threshold can yield misfire detection since this ratio is relatively large under misfire conditions and relatively low under normal combustion conditions.

Figure 4:
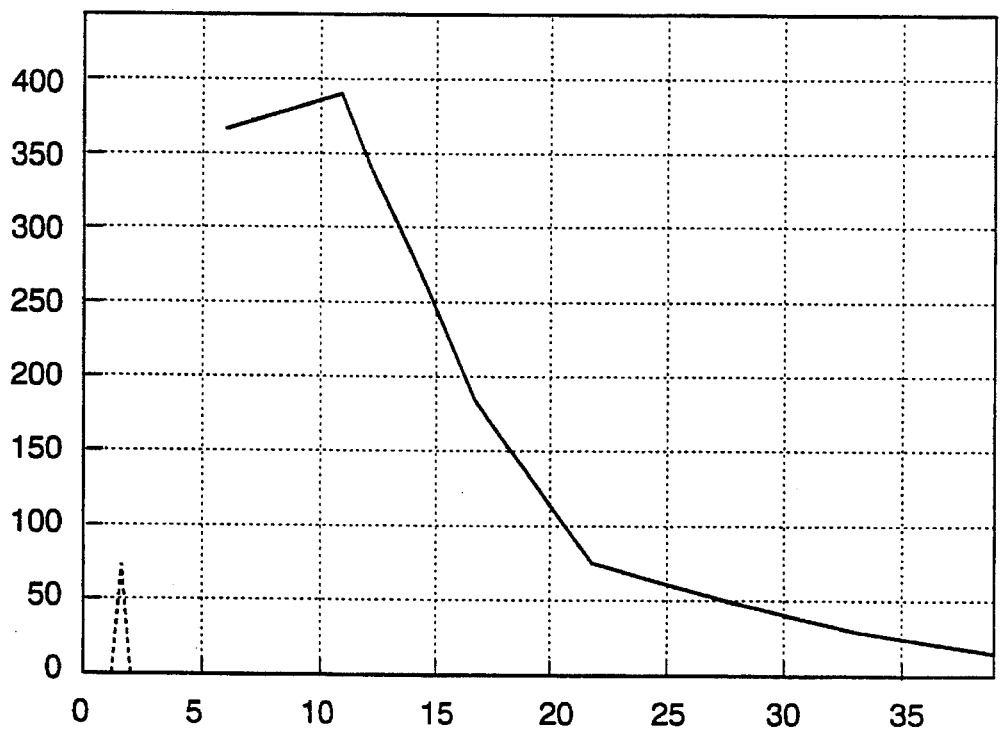
FIG. 4 is a graph which shows samples of conditional probability density functions of the ratio $M_1/M_6$, for normal and misfire conditions.

To illustrate the utility and performance of this algorithm, consider FIG. 4 which depicts samples of conditional probability density functions of this ratio (i.e. $M_1/M_6$) for normal and misfire conditions. For this example, the threshold (eta) is 2.4826. Misfire detection algorithm is:

$$M_1/M_6 > 2.4826 \Rightarrow \text{misfire}$$

$M_1/M_6 < 2.4826 \Rightarrow$ normal combustion.

Applying this algorithm to an actual misfire experiment conducted with a car having a 6 cylinder engine and an automatic transmission yielded error rates $<10^{-4}$. The actual threshold for any vehicle configuration may vary with load.

Figure 5:
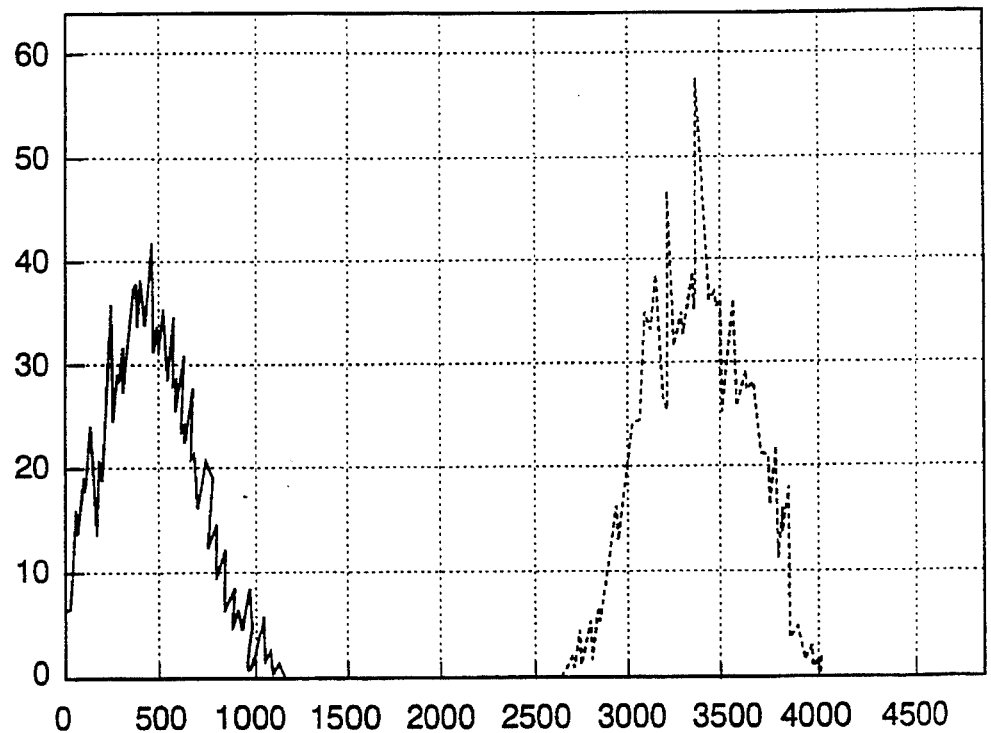
FIG. 5 is a graph which shows a sample of the conditional probability density function for $M_1$ for normal and misfire conditions by solid and dashed curves, respectively.

Alternatively, a misfire detection algorithm can be based upon the Fourier amplitude at engine cycle frequency $f_1$ (i.e. $M_1$). A sample of the conditional probability density function for $M_1$ for normal and misfire conditions is shown in FIG. 5. The solid curve is for normal misfire and the dashed curve is for misfire conditions.

The misfire algorithm for this example is:

$$M_1 > \text{threshold} \Rightarrow \text{misfire}$$

$M_1 <$ threshold $\Rightarrow$ normal combustion.

Error rates for experiments conducted with a car having 6 cylinder engine and automatic transmission are less than $10^{-4}$.

Yet another example algorithm is based upon a linear combination of $f_1$ and $f_c$:

$$a_1 f_1 + a_2 f_c$$

$$a_1 M_1 + a_2 M_c.$$

Many such algorithms have potential for misfire detection. For example, algorithms based upon the spectrum of angular speed for various multiples of engine cycles. Fourier components for such components will have a different relationship to cylinder firing frequency than the example in which data for one engine cycle is used.

Intermittent Misfire Detection

In meeting the CARB OBDII requirements, it is necessary to detect intermittent misfires occurring at relatively low rates. The use of sample intervals longer than one engine cycle is advantageous for detecting such misfires as the influence of a single misfire extends over more than a single engine cycle.

Alternatively, a single misfire can be detected by computing the spectrum of the crankshaft angular speed over a single engine cycle. However, the spectrum should be computed for two or more successive cycles. Certain characteristic patterns exist for the various Fourier components. For this case, it is advantageous to obtain in the engine cycle frequency amplitude as well as cylinder firing frequency amplitude.

Various algorithms can detect misfire as functions of these Fourier components. One such algorithm obtains differences in amplitudes of the Fourier components at $f_1$ and $f_c$, i.e., $M_1$ and $M_N$:

$$\begin{aligned} M_1(k) - M_1(k-1) \\ M_N(k) - M_N(k-1) \end{aligned} \quad (k \text{ integer})$$

where k and k-1 are the $k^{th}$ and $(k-1)^{st}$ engine cycles, respectively. Good identification is possible of misfires via functions in the two-dimensional plane $M_1$, $M_N$ by comparing the differences above with a linear combination $aM_1 + bM_N$. Alternatively, other functions of $M_1$ and $M_N$ are readily possible for certain engine/drivetrain configurations.

Isolation of the Misfiring Cylinder

Figure 6:
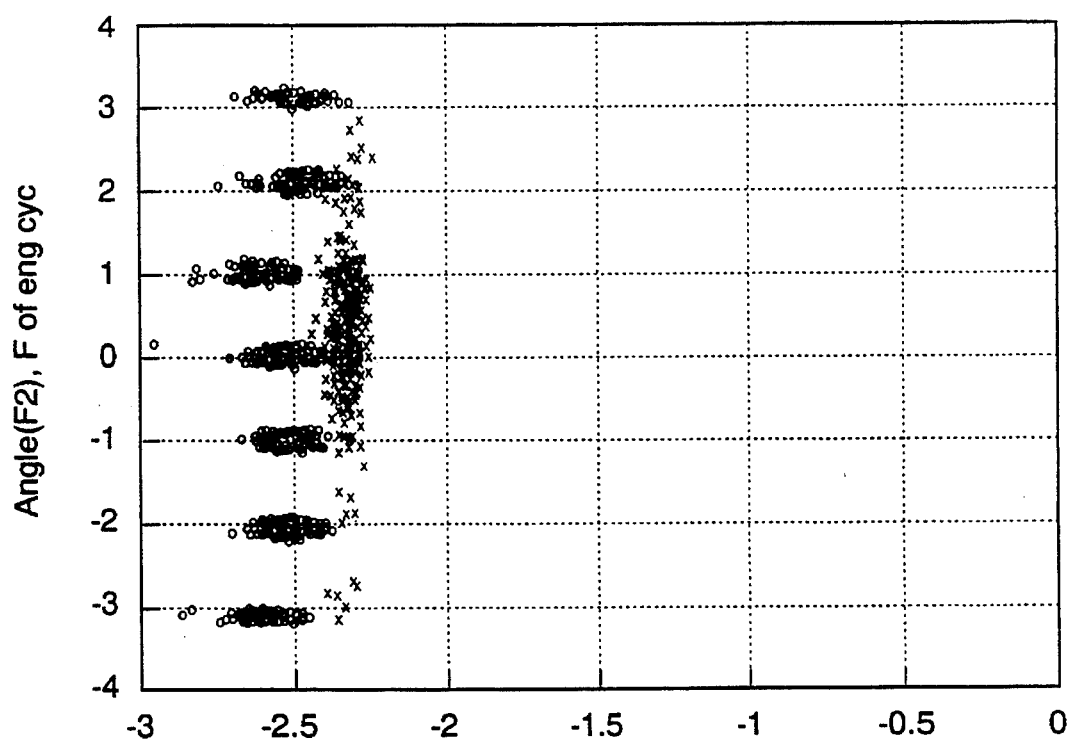
FIG. 6 is a graph illustrating the phase for misfires for a six cylinder engine operating at 4000 RPM, said load in third gear with the torque converter in lockup.

In addition to detecting misfires, it is desirable to identify the misfiring cylinder(s). The present method and system of detecting misfires based upon calculations of spectra for crankshaft angular speed is also suitable for isolating the misfiring cylinder. Whereas detecting misfire is accomplished using the amplitude of various Fourier components, isolation is accomplished from the phase of the cycle frequency component. Typically, the phase of this component has a unique value associated with the misfiring cylinder. For example, FIG. 6 illustrates the phase for misfires for a 6 cylinder engine operating at 4000 RPM, midload in 3rd gear with the torque converter in lockup. It should be noted that $-\pi$ and $\pi$ are identical phases in this figure. Each group of circles represents misfire for a specific cylinder.

An alternate method of detecting intermittent misfires is based upon computing spectra for a single engine cycle. Although the interval for computing the spectrum of angular speed is fixed, the starting point of the computation for the spectrum is not unique with respect to absolute crankshaft angular position. The fundamental Fourier amplitude at engine cycle frequency is most advantageous for detecting misfire, as it is this component which changes most significantly from normal to misfire conditions. Moreover, the change in amplitude is greatest wherever the misfire event occurs nearest to the start of the interval over which the spectrum is computed.

Figure 7:
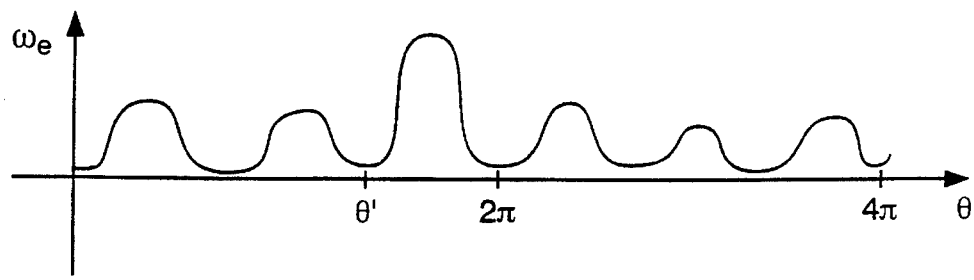
FIG. 7 is a graph which illustrates a typical crankshaft angular speed signal with misfire wherein independent variable θ is crankshaft angular position.

To illustrate this point, it is convenient to refer to FIG. 7 which illustrates a typical crankshaft angular speed signal with misfire. The independent variable $\theta$ is crankshaft angular position.

By way of illustration, it is assumed that $\theta = 0$ corresponds to TDC for #1 cylinder. The normal spectrum for $\omega_e$, i.e., $A_p$ would be computed (using DFT as an example only):

$$A_p = \sum_{k=0}^{K} \omega_k (W_K)^{pk} \quad \text{for } p = 1, N.$$

where K is the number of samples taken in one complete engine cycle and where $W_N = e^{j2\pi/M}$. However, the spectrum can equally well be computed for any complete engine cycle beginning at any arbitrary angle $\theta'$, corresponding to starting point k'.

$$A_p(k') = \sum_{k=0}^{K} \omega_{k+k'}(W_K)^{pk}.$$

In practice, the discrete Fourier transform obtained from sampled versions of $\omega_e(\theta)$ would be computed.

The change in amplitude of the fundamental Fourier component (i.e., at frequency $f_1$) is largest if $\theta'$ is chosen relatively close to the portion of the cycle in which misfire occurs. For convenience in explaining the present method, the full engine cycle is divided into N equal intervals (N=number of cylinders) of length $4\pi/N$. For this example, k'=K/N l (l=0,1, . . . , N−1). A set of N spectra $$A_p\left(\frac{K}{N}l\right)$$

are computed:

$$A_p\left(\frac{Kl}{N}\right) = \sum_{k=0}^{K} \omega_{k+\frac{kl}{N}}(W_K)^{pk} \quad l=0,1,\ldots N-1.$$

Typically, $A_p$ would be computed for p=1 (cycle frequency component) one p=N (cylinder firing frequency component).

Figure 8:
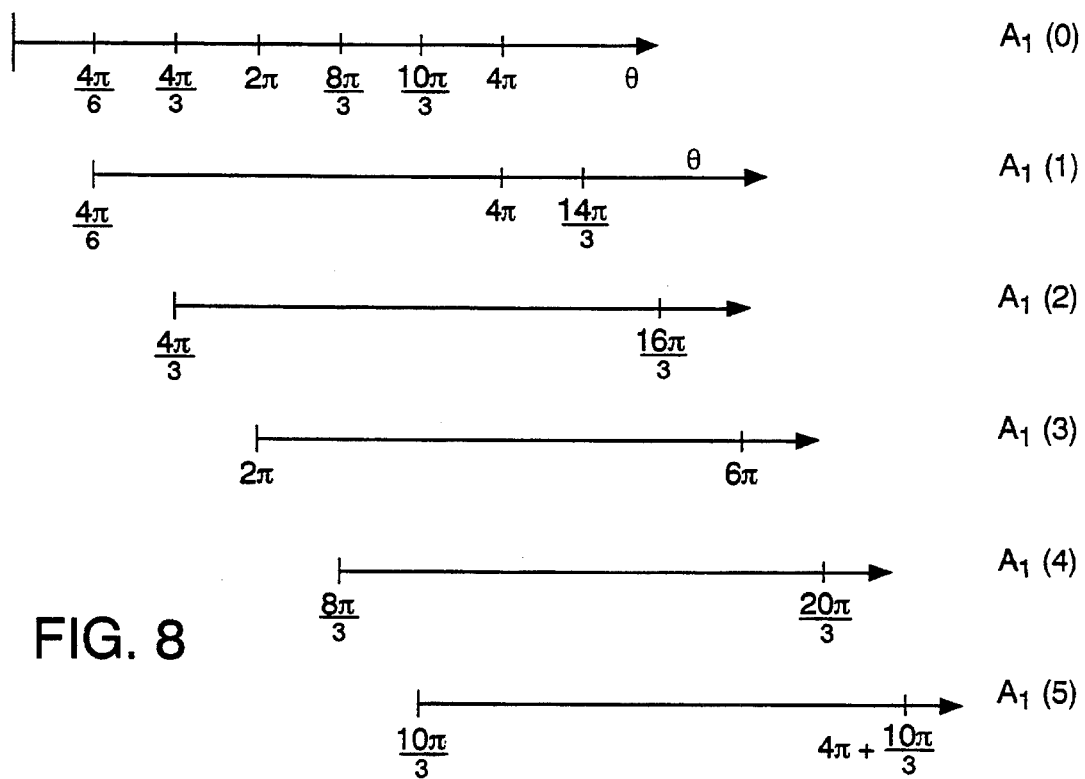
FIG. 8 illustrates crankshaft angular internals over which N spectra A, (1) are computed for a six cylinder engine and for cycle frequency, p, equal to 1.
Figure 9:
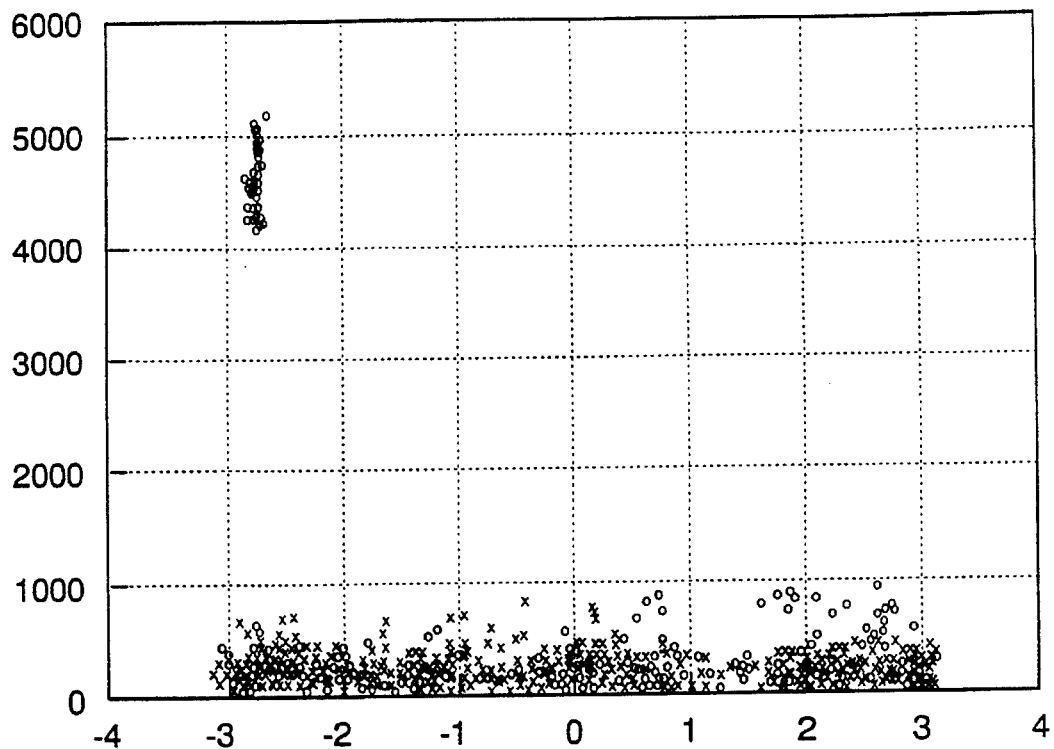
FIGS. 9 through 14 are graphs illustrating sampled results for misfire.
Figure 10:
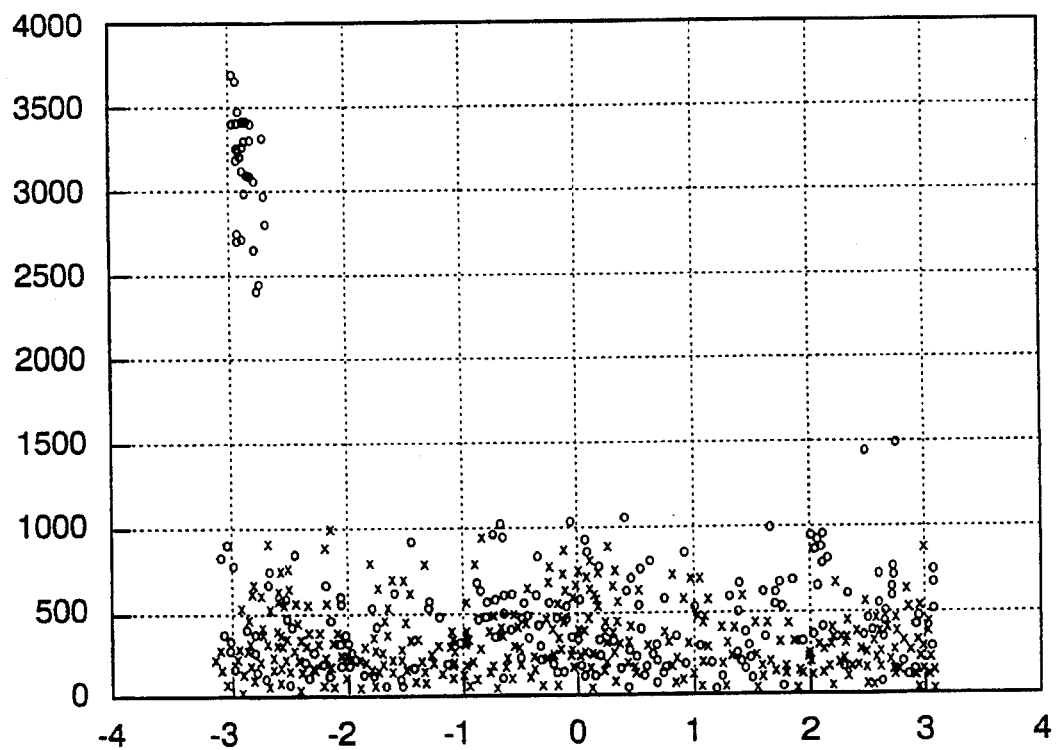
Figure 11:
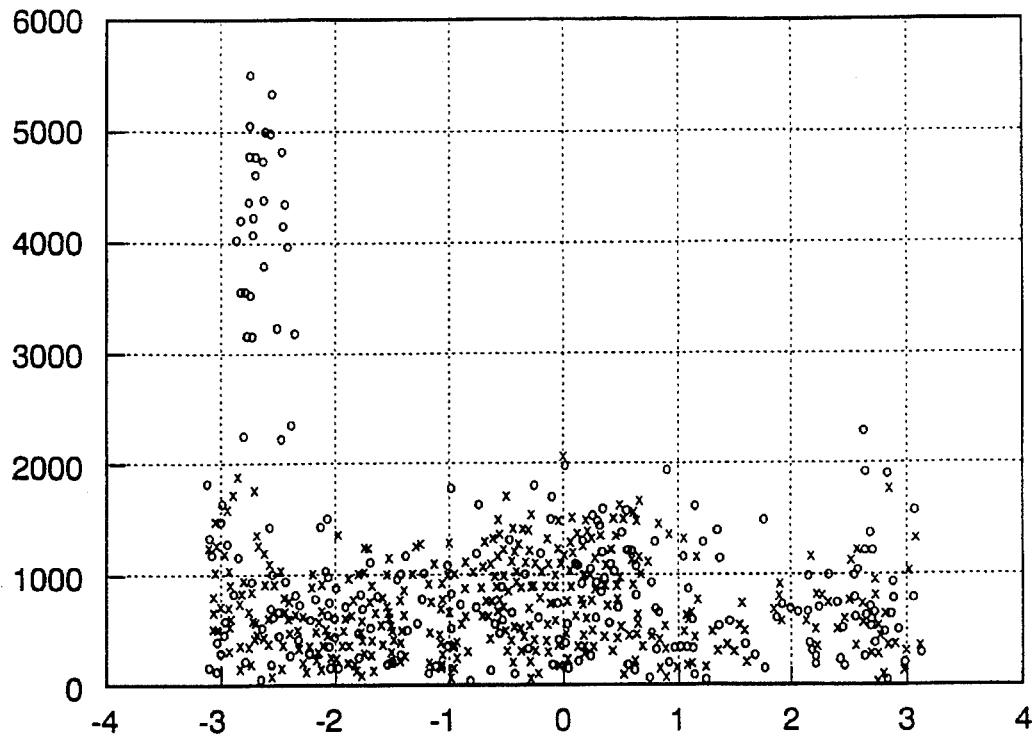

FIG. 8 illustrates the time intervals (actually crankshaft angular intervals) over which the N spectra $A_1(l)$ are computed for a 6 cylinder (N=6) engine and for p=1 (cycle frequency).

It should be emphasized that $A_1(l)$ is a complex number for each l having magnitude $M_1(l)$ and phase $\phi_1(l)$:

$$A_1(l)=M_1(l) \text{ e x p}[j\phi_1(l)]$$

where $$M_1(l)=|A_1(l)| \; \phi_1(l)=\text{angle } (A_1(l)).$$

One procedure for detecting misfire within any given engine cycle is to compare the magnitude $M_1$ with a threshold and the phase $\phi_1(l)$ with the phase criterion for each l. Whenever the magnitude and phase criteria are simultaneously satisfied, a given misfiring cylinder is identified.

It should be noted that there are many criteria which can be applied to the N spectral components for each p. Consequently, only an exemplary procedure is disclosed herein.

A preferred embodiment for intermittent misfire detection involves computing the magnitude $M_1$ and phase $\phi_1(l)$ for each of the shifted starting points described above (l=0,1,2, . . . N−1). That is, there are 2N values computed. For convenience in explaining this method:

$$M_1=Y$$

and $$\phi_1(l)=X.$$

Whenever there is a misfire, the value of these parameters satisfy the conditions:

$$-3<X<-2.1$$

$$Y>Y_t(RPM)$$

where $Y_t$ is an RPM (and possibly load) dependent threshold. Actually, experience has shown that with a fixed $Y_t$ threshold, the lowest required will suffice for misfire detection for all RPMs.

The following are results for a test car intermittent misfire. These results actually plot the X,Y parameters for each of several tests. The majority of the results presented below correspond to no load at various RPMs from idle 600 RPM to 6000 RPM. Of course, the ability to detect no load misfires guarantees detection of misfires under load. Also presented are selected results for midload and high load at certain RPMs.

In addition to detecting that a misfire has occurred, this method also identifies the misfiring cylinder via the number of shifts required to achieve the detection conditions. For each of the following tests, the fuel was interrupted to a given cylinder once in each 10 engine cycles. This is a misfire rate of 1/60=0.17 (1.7%).

It is shown hereinbelow that 100% of these misfires were detected. The small circles within the detection range indicate that a misfire was correctly detected for the particular misfiring cylinder during the particular engine cycle. This result has been achieved at no load from idle (cold) 600 RPM to 6000 RPM.

Figure 12:
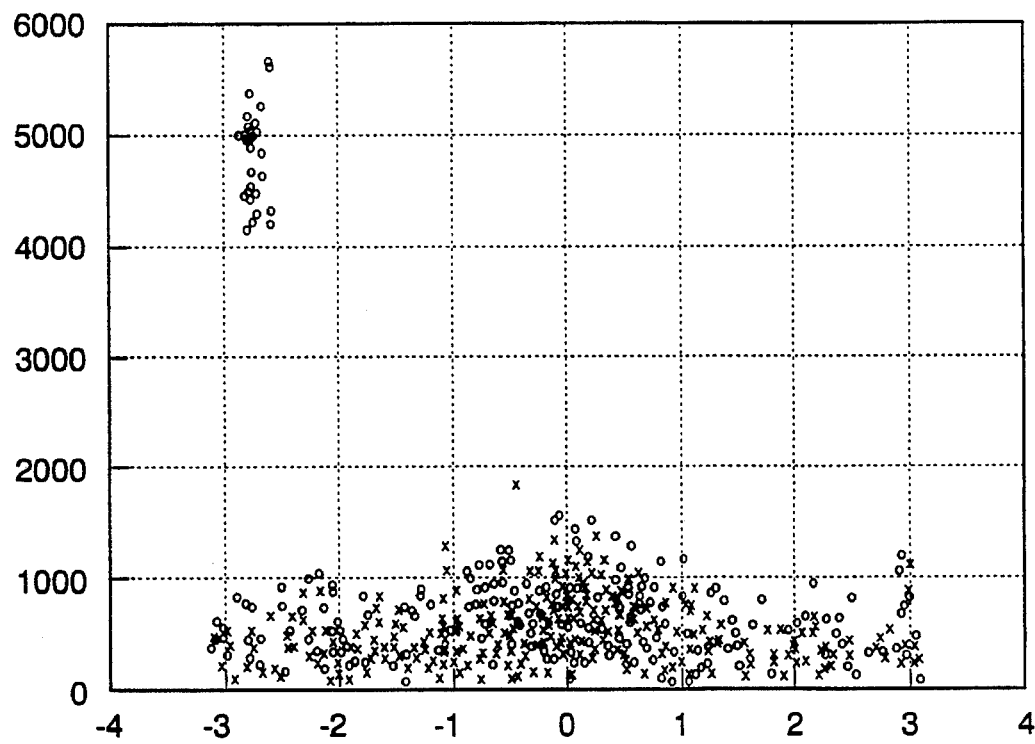
Figure 13:
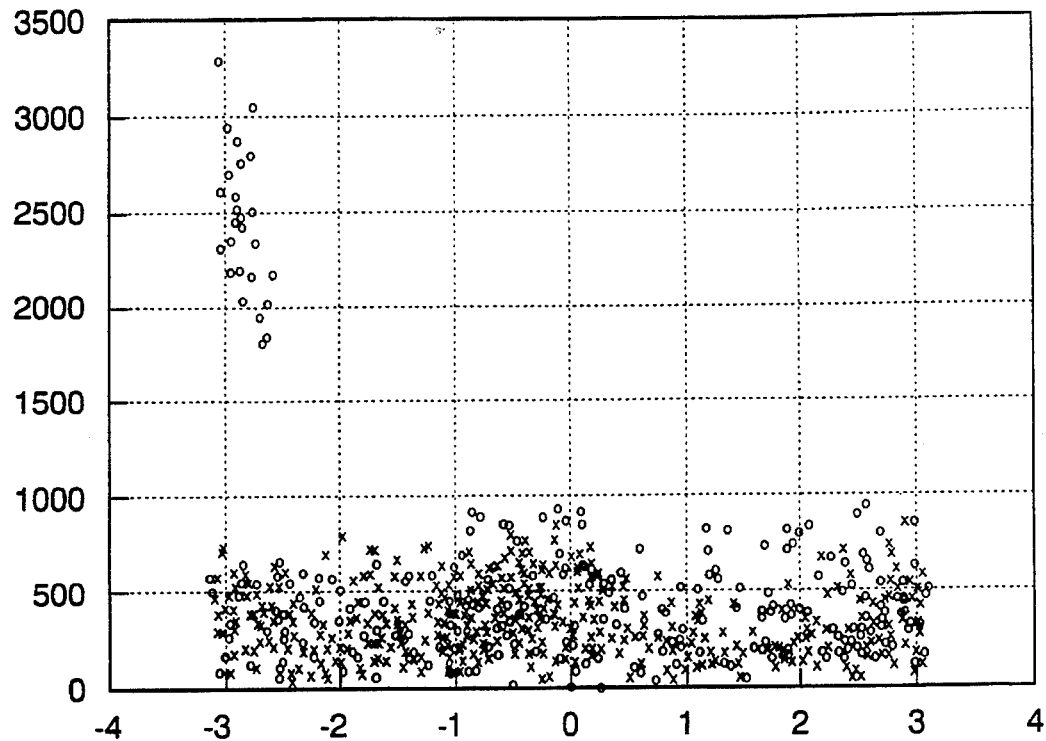
Figure 14:
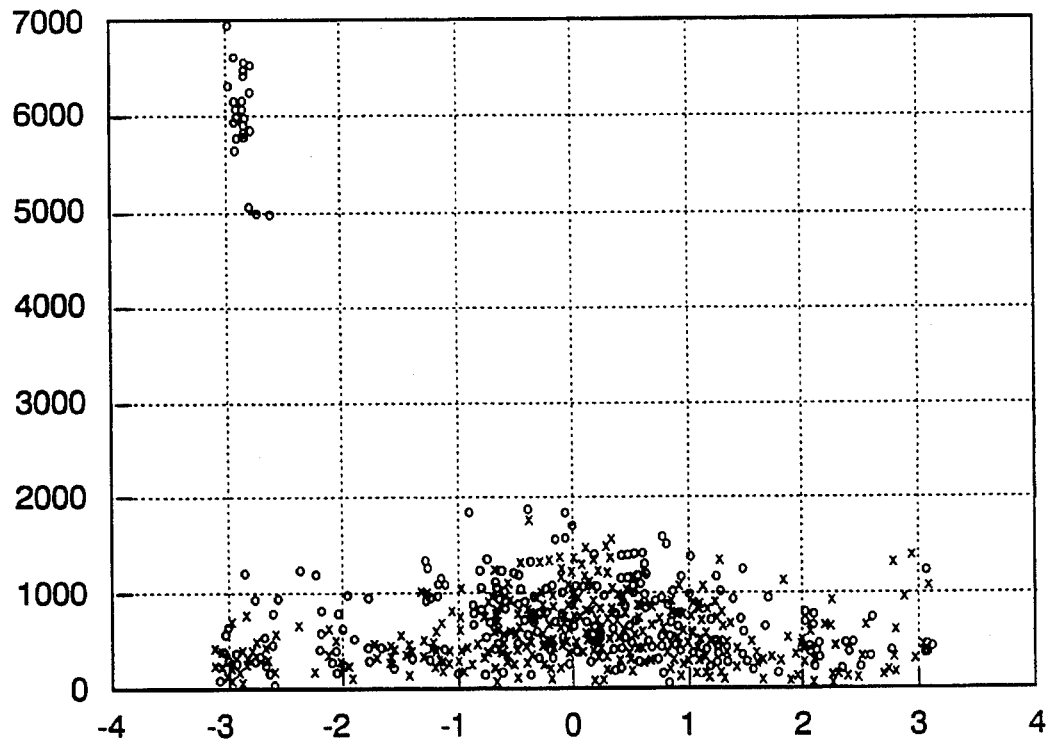

FIGS. 9 through 14 present sampled results for misfire on cylinder #4. The $Y_t$ threshold was fixed at 1500. All but two of these are for zero external load. FIGS. 12 and 14 are for midload at 4000 and 6000 RPM, respectively. There is a significant increase in the Y parameters for these conditions. High load yields even greater Y values.

100% of these misfires were detected. Moreover, the correct misfiring cylinder was correctly identified by the shift required to achieve X and Y values within the misfire detection conditions. In the case of cylinder #4, this shift was about 5/6 of an engine cycle.

Figure 15:
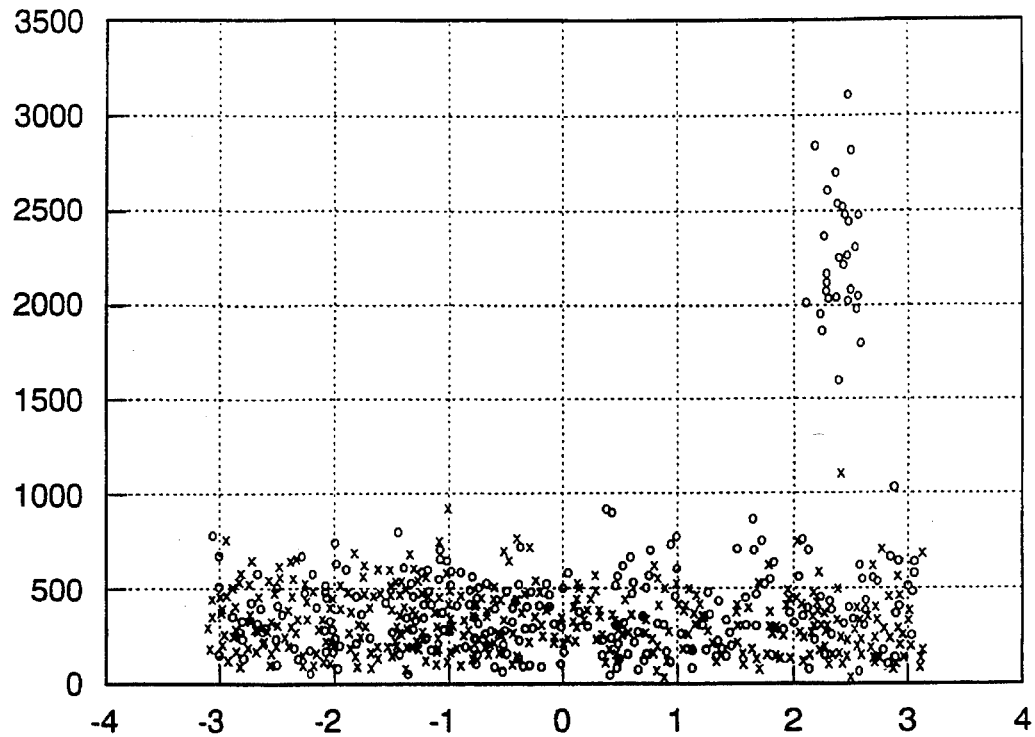
FIG. 15 is a graph illustrating the resulting computation when a shift is incorrect.

The amount of shift required for misfire is determined by the X value. Whenever $Y > Y_t$, there is a potential misfire. The algorithm examines the shifted computation for X finding the shift such that the X value satisfies $-3<X<-2.1$. FIG. 15 illustrates the results of this computation when the shift is incorrect. The Y values satisfy the threshold condition but X values are wrong.

The shift is performed before computation of X and Y because in the present method of misfire, a misfire in any engine affects the X and Y values for the next cycle unless the cycle is defined as beginning with the cylinder which is misfiring. This is purely a consequence of the computational method used.

Figure 16:
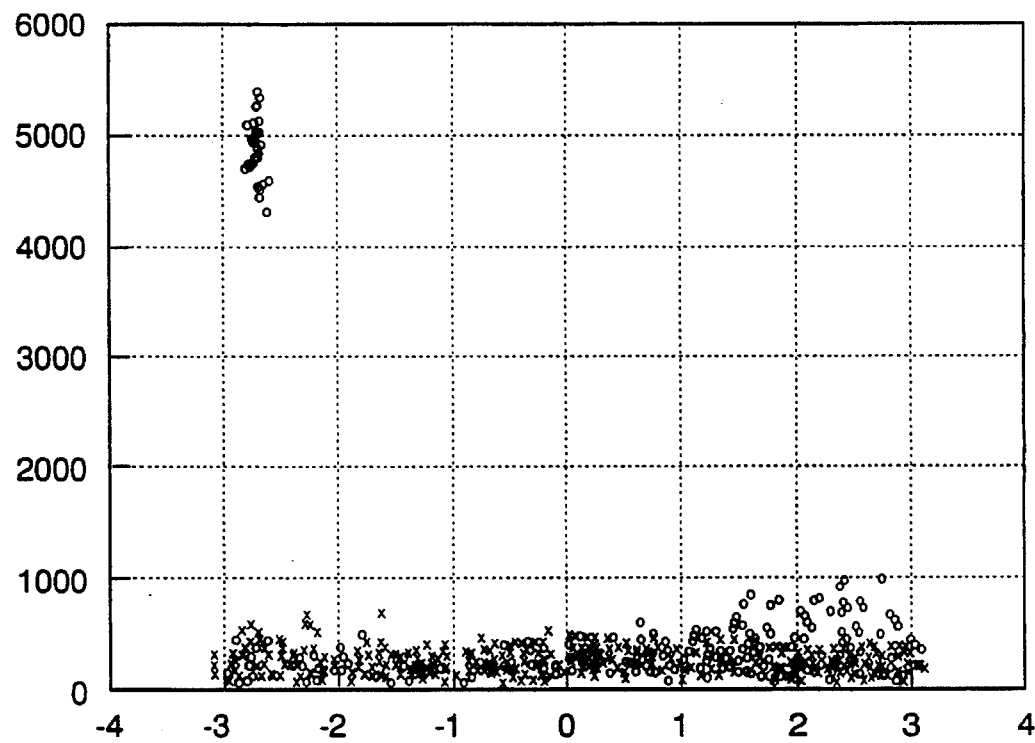
FIGS. 16, 17 and 18 are graphs illustrating the results for a particular cylinder at no load for 1250 RPM, 4000 RPM and 6000 RPM, respectively.
Figure 17:
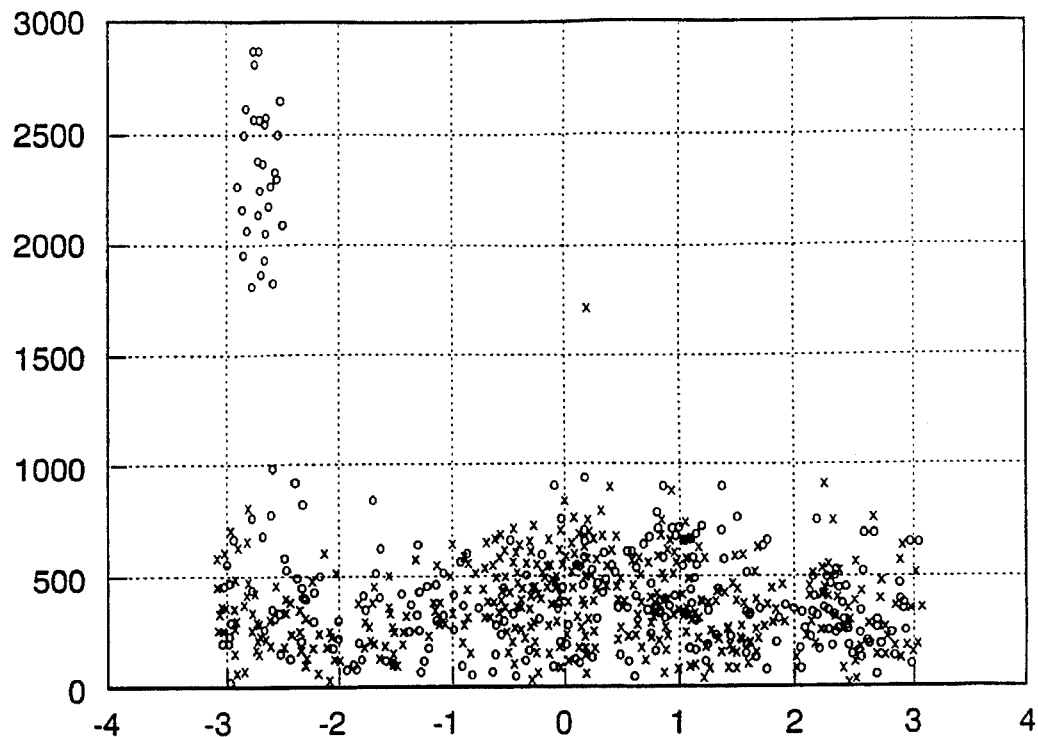
Figure 18:
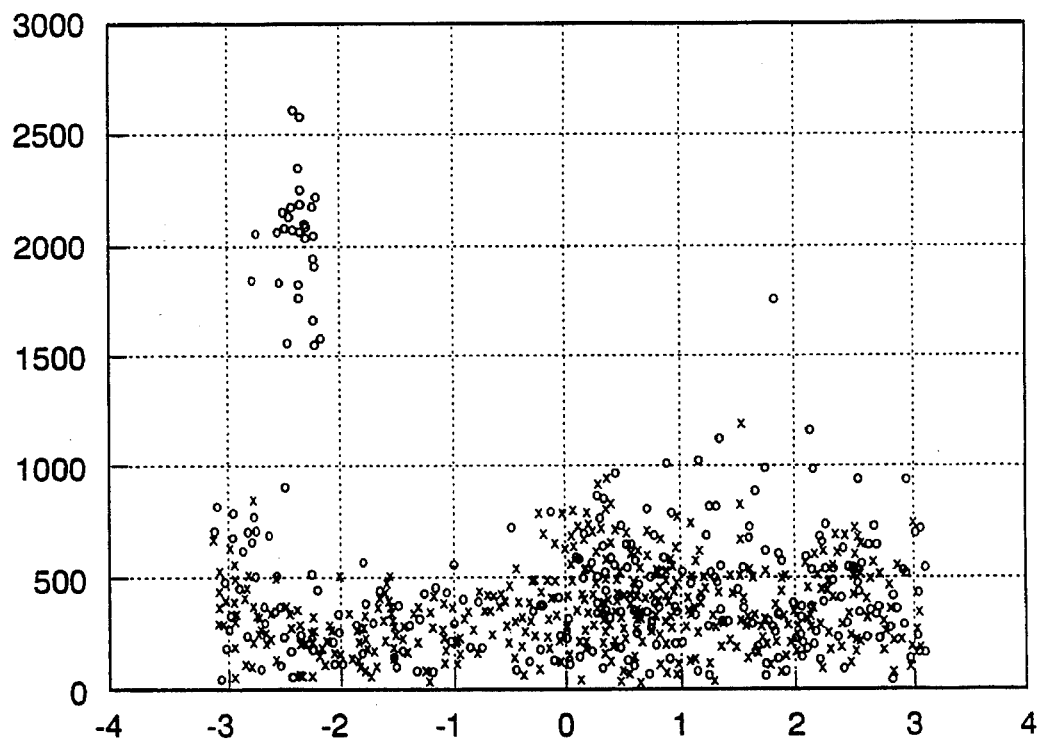

Similar results have been achieved for all six cylinders but are not presented completely herein for the sake of brevity. As a representative example, FIGS. 16, 17 and 18 show the results for cylinder #1 at no load for 1250 RPM, 4000 RPM and 6000 RPM, respectively. Once again, 100% of the misfire for this cylinder was detected.

One of the more challenging operating conditions for misfire detection is idle and, in particular, cold idle. The $Y_t$ threshold for idle is 2500. For the case of this sample, all intermittent misfires have been detected. However, other tests have been conducted which have a 3% missed detection error rate with no false alarms.

While the best mode for carrying out the invention has been described in detail, those familiar with the art to which this invention relates will recognize various alternative designs and embodiments for practicing the invention as defined by the following claims.

What is claimed is:

1. A method for detecting a misfire of a reciprocating internal combustion engine including a plurality of reciprocating components having an engine cycle frequency, N cylinders and a crankshaft, the method comprising the steps of:

generating an electrical signal as a function of crankshaft angular velocity, the electrical signal containing data;

sampling the data synchronously with crankshaft angular position at a sampling rate to obtain sampled data;

transforming the sampled data to an equivalent frequency domain spectrum, including frequency components having complex amplitudes at the engine cycle frequency and harmonics thereof; and applying an algorithm to the magnitudes of the frequency components, which algorithm distinguishes between a true misfire and normal cycle variability which characterizes the combustion process in each cylinder of the engine to thereby obtain a misfire signal and wherein the method further comprises the step of shifting the sampled data for (N-1) of the cylinders prior to the step of transforming to identify the cylinder in which the misfire occurred.

2. The method as claimed in claim 1 wherein the frequency components of the engine cycle frequency have a phase and wherein the method includes the step of identifying the cylinder in which the misfire occurred based on the phase.

3. The method of claim 1 wherein the frequency components have phases and wherein the algorithm is also applied to the phases of the frequency components.

4. The method of claim 1 wherein the step of transforming includes the step of applying a DFT to the sampled data.

5. The method of claim 1 wherein the step of transforming includes the step of applying an FFT to the sampled data.

6. A system for detecting a misfire of a reciprocating internal combustion engine including a plurality of reciprocating components having an engine cycle frequency, N cylinders and a crankshaft, the system comprising:

means for generating an electrical signal as a function of crankshaft angular velocity, the electrical signal containing data;

means for sampling the data synchronously with crankshaft angular position at a sampling rate to obtain sampled data;

means for transforming the sampled data to an equivalent frequency domain spectrum, including frequency components having complex amplitudes at the engine cycle frequency; and means for applying an algorithm to the magnitudes of the frequency components, which algorithm distinguishes between a true misfire and normal cyclic variability which characterizes the combustion process in each cylinder of the engine to thereby obtain a misfire signal and wherein the system further comprises means for shifting the sampled data for (N-1) of the cylinders prior to transformation of the sampled data to identify the cylinder in which the misfire occurred.

7. The system as claimed in claim 6 wherein the frequency components of the engine cycle frequency have a phase and wherein the system further includes means for identifying the cylinder in which the misfire occurred based on the phase.

8. The system as claimed in claim 6 wherein the frequency components have phases and wherein the algorithm is also applied to the phases of the frequency components.

9. The system as claimed in claim 6 wherein the step of transforming includes the step of applying a DFT to the sampled data.

10. The system as claimed in claim 6 wherein the step of transforming includes the step of applying an FFT to the sampled data.

* * * * *

UNITED STATES PATENT AND TRADEMARK OFFICE
CERTIFICATE OF CORRECTION

PATENT NO.   :   5,487,008
DATED        :   January 23, 1996
INVENTOR(S)  :   William B. Ribbens et al.

It is certified that error appears in the above-indentified patent and that said Letters Patent is hereby corrected as shown below:

Column 3, line 35, before " (denoted" delete "ti" .

Signed and Sealed this

Sixth Day of August, 1996

Attest:

BRUCE LEHMAN

Attesting Officer        Commissioner of Patents and Trademarks